United States Patent
Genise et al.

[11] Patent Number: 6,116,105
[45] Date of Patent: Sep. 12, 2000

[54] METHOD/SYSTEM FOR CONTROLLING UPSHIFTING AFTER RESETTING THE VALUE OF A CONTROL PARAMETER INDICATIVE OF GROSS COMBINED WEIGHT OF VEHICLES

[75] Inventors: Thomas A. Genise, Dearborn; Daniel P. Janecke, Kalamazoo; Eric J. Von Oeyen, Southfield, all of Mich.

[73] Assignee: Eaton Corporation, Cleveland, Ohio

[21] Appl. No.: 09/356,436

[22] Filed: Jul. 19, 1999

Related U.S. Application Data

[63] Continuation of application No. 09/232,252, Jan. 14, 1999, and application No. 09/397,328, Sep. 16, 1999.

[51] Int. Cl.$^7$ ................................................. F16H 59/52
[52] U.S. Cl. ............................ 74/335; 701/51; 477/900
[58] Field of Search .......................... 477/900; 74/335; 701/51

[56] References Cited

U.S. PATENT DOCUMENTS

| | | | |
|---|---|---|---|
| 5,272,939 | 12/1993 | Markyvech et al. | 447/120 |
| 5,335,566 | 8/1994 | Genise et al. | 447/124 |
| 5,487,005 | 1/1996 | Genise | 364/424.1 |
| 5,490,063 | 2/1996 | Genise | 364/424.1 |
| 5,491,630 | 2/1996 | Genise et al. | 364/424.1 |
| 5,582,558 | 12/1996 | Palmeri et al. | 477/109 |
| 5,678,453 | 10/1997 | Dresden, III | 74/335 |
| 5,928,107 | 7/1999 | Bieber | 701/51 |

*Primary Examiner*—Dirk Wright
*Attorney, Agent, or Firm*—Howard D. Gordon

[57] ABSTRACT

A system/method of resetting the value of a control parameter ($GCW_{CP}$) indicative of vehicular gross combined weight and determined as a filtered/averaged value, to a predetermined default value upon sensing vehicle operating conditions deemed indicative of a change in vehicle loading. A vehicle automated mechanical transmission system is controlled as a function of the value of the control parameter. The default value is relatively high compared to the expected range of actual vehicle gross combined weight. Large skip upshifts, greater than 50% ratio step, are prohibited after a reset until the control parameter value is verified.

15 Claims, 3 Drawing Sheets

METHOD/SYSTEM FOR CONTROLLING UPSHIFTING AFTER RESETTING THE VALUE OF A CONTROL PARAMETER INDICATIVE OF GROSS COMBINED WEIGHT OF VEHICLES

RELATED APPLICATIONS

This application is a continuation of U.S. Ser. No. 09/232,252 filed Jan. 14, 1999, and titled AUTOMATIC TRANSMISSION UPSHIFT CONTROL, and of U.S. Ser. No. 09/397,328 filed, Sep. 16 1999, and titled IMPROVED METHOD/SYSTEM FOR RESETTING THE VALUE OF A CONTROL PARAMETER INDICATIVE OF GROSS COMBINED WEIGHT OF VEHICLES TO A DEFAULT VALUE THEREOF, both assigned to EATON CORPORATION, assignee of this application.

BACKGROUND OF THE INVENTION

1. Field of Invention

This invention relates to systems/methods for controlling upshifting as a function of a value indicative of vehicular gross combined weight (GCW) in vehicles equipped with automated transmission systems and electronic data links. In particular, the present invention relates to an automatic transmission control system/method for heavy-duty trucks or coaches equipped with an electronic databus carrying engine torque and other information, such as a databus conforming to the CAN, SAE J1922 and/or SAE J1939 protocol, wherein the control parameter indicative of GCW is a filtered, averaged value, often an average of 500 or more individual determination iterations, to minimize the effects of driveline torsionals, noise and the like, and wherein the GCW control parameter value is reset to a default value at power-up or the like.

More particularly, the present invention relates to a control wherein the default value is relatively high and wherein certain skip upshifts are inhibited until the actual GCW is validated with a degree of confidence.

2. Description of the Prior Art

In a heavy-duty truck or tractor-semitrailer vehicle, vehicle GCW may vary in a range of from about 10,000 pounds up to about 80,000 pounds or more, depending upon vehicle type and load. It is highly desirable to at least approximate current GCW and to provide this information to vehicle systems such as, e.g., an automated transmission system, a fleet management system, a variable suspension system, an onboard central tire inflation system (CTIS), an antilock brake system (ABS) or the like.

It is known in the prior art to provide various scale systems for vehicles wherein a control parameter indicative of vehicle weight, or at least of the weight of the vehicle load, may be measured. See, e.g., U.S. Pat. Nos. 4,714,122; 4,728,922; 5,014,206 and 4,839,835, the disclosures of which are incorporated herein by reference.

These systems required scale or other weighing systems which were costly to provide and/or maintain and were best suited for vehicles, such as garbage trucks or dump trucks, involved in special haulage applications, such as commercial refuse disposal or the like.

Methods/systems for calculating GCW as a function of engine/drivewheel torque and vehicle acceleration, as read from signals on a data link and/or outputted by various sensors, are known in the prior art. In one example, the GCW of a vehicle may be determined from known drive train characteristics (transmission ratio, axle ratio, tire radius, etc.), engine torque and vehicle acceleration measured at time $t_1$ and $t_2$ if and $t_2$ are relatively close (within seconds). This may be expressed as:

$$GCW = (T_1 - T_2) \div ((A_1 - A_2) \times C)$$

where:

$T_i$ = Wheel torque at time $t_i$;

$A_i$ = Vehicle acceleration at time $t_i$; and $C$ = Wheel rolling radius ÷ gravity constant.

To minimize the effects of drivetrain torsionals, noise and the like, GCW is, preferably, determined during or immediately after completion of an upshift and the control parameter $GCW_{CP}$ is a running, filtered average of many individual iterations of GCW determination. While the above-described methods/systems are very effective, they are not totally satisfactory as, in certain circumstances, they may not be as responsive as desired to situations wherein vehicles have stopped to change their loading, such as, for example, by adding or unloading cargo, connecting or disconnecting a semitrailer taking on or discharging coach passengers, or the like.

Automated vehicular systems using GCW as a control parameter and/or having logic for determining GCW may be seen by reference to U.S. Pat. Nos. 5,272,939; 5,335,566; 5,487,005 and 5,490,063, the disclosures of which are incorporated herein by reference.

A system for resetting the highly filtered value of GCW upon sensing conditions indicative of (i) the vehicle being at rest and/or the highly filtered value ($GCW_{CP}$) differing from a less-filtered test value ($GCW_{TEST}$) by greater than a predetermined value may be seen by reference to U.S. Pat. No. 5,491,630, the disclosure of which is incorporated herein by reference.

When a vehicle is stopped and then restarted, the GCW value is typically set to a default value. If the default value is relatively low (45,000 pounds or less), upshifts will be undesirably inhibited until a more accurate value is established. If the default value is relatively high (180,000 to 300,000 pounds, by way of example), the logic may become undesirably aggressive in attempting skip upshifts.

SUMMARY OF THE INVENTION

In accordance with the present invention, the drawbacks of the prior art are minimized or eliminated by the provision of a system/method for determination of vehicular GCW and controlling shifting wherein the value of the control parameter outputted by the system as indicative of vehicular gross combined weight ($GCW_{CP}$) is a relatively highly filtered, averaged value of a large number of previous ($GCW_i$) determination iterations, and said value is reset to a preselected/predetermined, relatively high default value upon the occurrence of conditions associated with probable vehicle change of load, such as power-up, and until a high degree of confidence exists in the filtered value of GCW, skip upshifts of greater than a predetermined step are prohibited.

The transmission shift logic, upon determining that an upshift is required, will evaluate possible skip shifts as a function of available drivewheel torque in the target gear under current vehicle operating conditions. [See copending U.S. Ser. No. 09/232,259.]

By selecting a relatively high default GCW value, and prohibiting certain skip but not single upshifts until the current GCW value is verified with a degree of confidence, single upshifts are not discouraged, while possibly undesirable skip upshifts are prevented.

3

This and other objects and advantages of the present invention will become apparent from a reading of the detailed description of the preferred embodiment taken in connection with the attached drawings.

DESCRIPTION OF THE PREFERRED EMBODIMENT

Certain terminology will be used in the following description for convenience in reference only and will not be limiting. The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed. The term "upshift" as used herein, shall mean the shifting from a lower speed gear ratio into a higher speed gear ratio.

For purposes of illustration, the vehicular GCW determination method/system of the present invention is disclosed as associated with a vehicular drivetrain including an automated mechanical transmission and an electronically controlled engine having a CAN, SAE J1922 or SAE J1939 type data link. It is understood that the vehicular GCW determination system/method of the present invention also may be advantageously utilized with other types of vehicular drivetrain systems.

Figure 1:
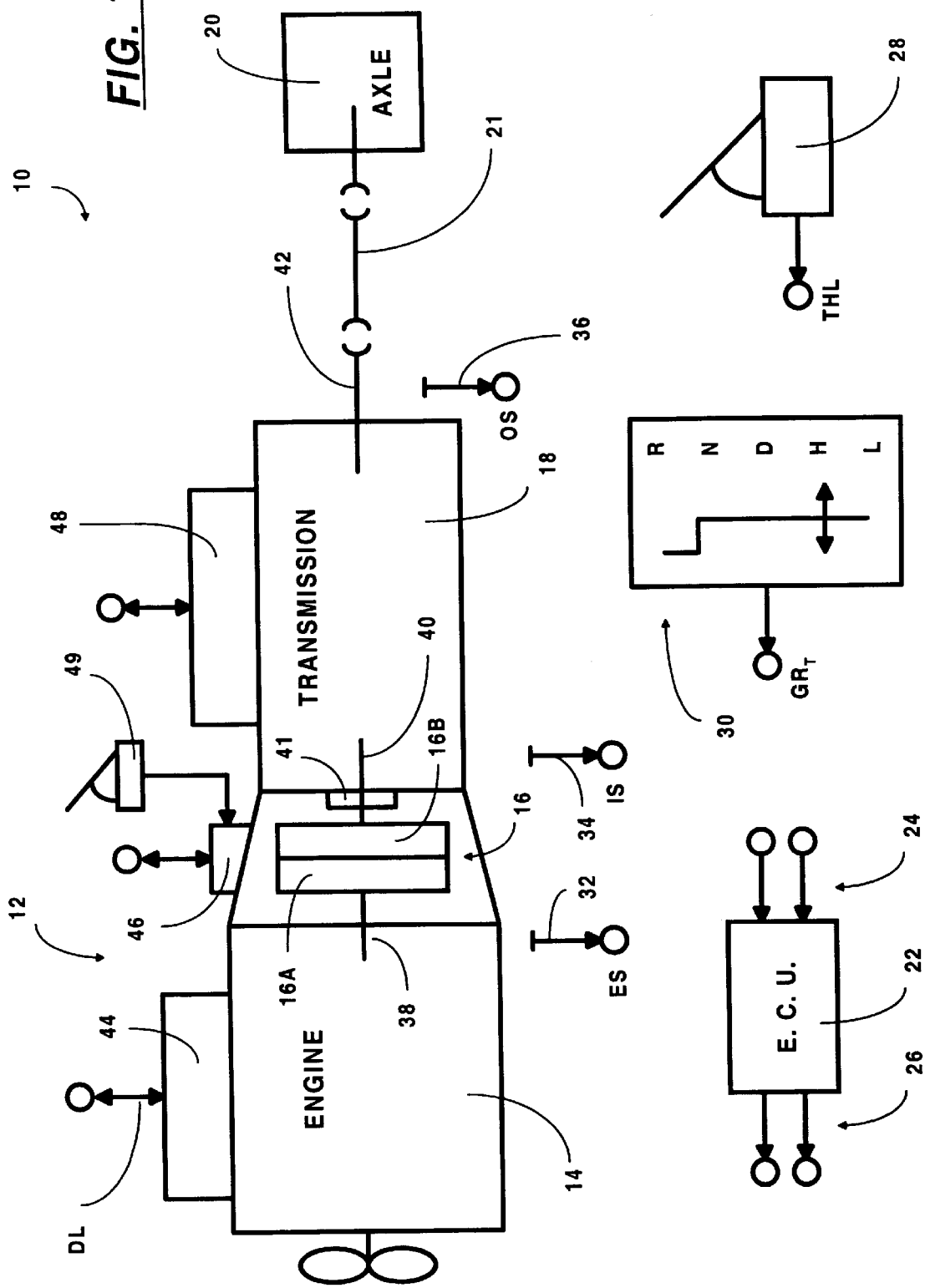
FIG. 1 is a schematic illustration of a vehicular drivetrain including a mechanical transmission, an electronic data link and an electronically controlled engine of the type advantageously utilizing the system/method of the present invention.

Referring to FIG. 1, a vehicle drivetrain 10 including an automated transmission system 12 having a compound transmission 18 and an electronically controlled internal combustion engine 14 is illustrated. Transmission 18 is housed within a housing and includes an input shaft 40 driven by a prime mover (such as diesel engine 14) through a selectively disengaged, normally engaged friction master clutch 16 having an input or driving portion 16A drivingly connected to the engine crankshaft 38 and a driven portion 16B rotatably fixed to the transmission input shaft 40.

The engine 14 is fuel throttle controlled, preferably electronically, and is connected to an electronic data link DL of the type defined in SAE J1922 and/or SAE J1939 protocol, and the master clutch 16 may be manually controlled by a clutch pedal 14 or the like. Master clutch 16, if used in fully automatic transmission systems, may be automatically controlled, see U.S. Pat. Nos. 4,081,065 and 4,361,060, the disclosures of which are incorporated herein by reference. Alternatively, fuel modulation (as disclosed in U.S. Pat. No. 4,850,236) may be utilized for shifting without releasing the master clutch. Typically, electronically controlled engine E will be provided with its own electronic control unit 44. An input shaft brake 41 may be provided to provide quicker manual upshifting as is well known in the prior art. It is understood that a data link or databus, DL, complying with SAE J1939 protocol, or similar protocol, will carry information indicative of engine torque, engine speed and transmission output shaft speed.

Transmissions similar to mechanical transmission 18 are well known in the prior art and may be appreciated by reference to U.S. Pat. Nos. 3,105,395; 3,283,613 and 4,754,665, the disclosures of which are incorporated by reference.

For purposes of determining vehicular GCW and/or for providing information to various vehicle systems, an input shaft speed sensor 34, an engine speed sensor 32 and/or an output shaft speed sensor 36 may be utilized. Engine speed and/or output shaft speed information preferably is carried on the data link DL. As is well known (see above-mentioned U.S. Pat. No. 4,361,060), the signals (OS) from speed sensor 36 or other sensors may be differentiated with respect to time to provide signals (dOS/dt) having a value indicative of vehicle acceleration and the like. The ECU 22 will, preferably, include logic elements or rules for differentiating various input signals with respect to time.

The ECU 22 may be of the type illustrated in U.S. Pat. No. 4,595,986, the disclosure of which is incorporated herein by reference. The ECU is effective to process the inputs 24 in accordance with predetermined logic rules to issue command output signals 26 to the engine ECU 44 and to actuator 48 and/or to a display unit and/or to other systems, such as an ABS system or a CTIS system or the like. As an alternative, a separate ECU for GCW determination may be provided or the logic rules for determining vehicle GCW may be in the engine ECU 44 or another system ECU.

Output shaft 42 speed sensor 36 may be replaced by a wheel speed signal from an ABS system and/or by sensors indicating input shaft speed and transmission gear ratio (ES=IS=OS*GR) and/or by a signal indicative of vehicle speed such as from the vehicle speedometer. Input shaft speed (IS) may be taken as equal to engine speed (ES), available on datalink DL, when clutch 16 is fully engaged. Gear ratio (GR) may be determined from position sensors or the like associated with the transmission shift actuator 48, or may be calculated from output shaft and input shaft speed (GR=IS/OS). By way of example, engaged gear ratio may be determined when ES (=IS) equals OS*GR, for a known GR, over a predetermined period of time. Similarly, output shaft speed may be determined from input shaft speed and gear ratio (OS=IS/GR). An operator shift console 30 provides a signal (GR$_T$) indicative of the ratio or mode of operation required by the operator.

According to the present invention, a system/method is provided for determining vehicular GCW using existing information from an electronic engine (SAE J1922 or J1939 protocol) data link and/or using information from various sensors such as, for example, signals indicative of engine/drivewheel torque and a signal indicative of vehicle or output shaft speed.

In a preferred embodiment, it can be mathematically proven that for two times, $t_1$ and $t_2$, that are close to each other (within seconds):

$$T_1 - T_2 = C \times W \times (A_1 - A_2)$$

where:

T$_i$=Wheel torque at time t$_i$;

C=Rolling radius/gravity constant;

W=Gross combination weight; and

A$_i$=Vehicle acceleration at time t$_i$.

The proof of this relationship may be seen by reference to aforementioned U.S. Pat. No. 5,491,630. Based upon this relationship, a value closely approximating (within about 2,000–3,000 pounds) GCW may be determined from the expression:

$$GCW=W=(T_1-T_2)\div((A_1-A_2)*C)$$

Also, to minimize errors, a plurality of GCW values is determined with GCW$_{CP}$ equaling an average:

$$GCW_{CP} = \frac{\sum_{i\geq 2}^{i} ((T_1 - T_i) \div ((A_1 - A_i)*C))}{(i-1)}$$

It has been found that more accurate determinations of GCW may be obtained at completion of an upshift, especially if time t$_1$ is selected at the instant during an upshift immediately prior to engagement of the new ratio. At this instant, T$_1$, torque supplied from the engine to the drivewheels, is zero, and vehicle acceleration A$_1$ is a relatively low, possibly negative, value. Times t$_2$, t$_3$ . . . t$_i$ may then be any point after engine power is sufficiently applied to the drivewheels through the vehicle powertrain for up to four seconds after time t$_1$.

In practice, a new GCW$_i$ is calculated about every 40 milliseconds after t$_2$ until about four seconds after t$_1$. Preferably, the GCW$_i$ values are then summed and averaged. The filtering/averaging technique adjusts for errors in each individual iteration due to torsionals, noise and the like which may render individual iterations of GCW relatively inaccurate. When the counter reaches 1,000, the sum is divided in half, the counter set to 500, and the averaging continues. This will provide a filtering of the GCW value.

$$GCW_{CP} = \frac{[GCW_i + (499*GCW_{CP})]}{500}$$

According to a preferred embodiment, after time t$_1$, when the initial A$_1$ value is sensed, values of A$_2$ . . . $_i$ and T$_2$ . . . $_i$ will not be sensed until certain conditions are met, assuring that the subsequent values are different enough in magnitude from the time t$_1$ values to provide valid calculations for GCW. These conditions, determined from on-vehicle testing, are:

(1) t$_i$ is less than four seconds after t$_1$;

(2) the engine is operating at greater than a reference torque (about 19 percent of peak torque);

(3) vehicle acceleration is greater than a reference value (dOS/dt>about 20 RPM/sec.);

(4) input shaft speed greater than a reference value (IS>about 1,200 RPM for a heavy-duty diesel engine);

(5) vehicle acceleration has changed; and (6) a shift is not in progress.

In practice, to get T$_i$, the drivewheel torque at time t$_i$, the engine torque is sensed, preferably from the electronic data link DL, and used to derive the drivewheel torque in a known manner. Generally, torque at the drivewheels may be determined from the following:

Torque at wheels=(engine torque)*(gear ratio)*(axle ratio)*(drivetrain efficiency);

where engine torque=[(percent engine torque)*(peak engine torque)]–[(torque to drive vehicle accessories)+(torque to accelerate engine)].

To achieve even greater accuracy, it is desirable to sense engine flywheel torque (T$_{FW}$) from the relationship:

$$T_{FW}=T_{EG}-T_{BEF}-T_{ACCES}-T_{ACCEL}$$

where:

T$_{FW}$=engine flywheel torque;

T$_{EG}$=gross engine torque;

T$_{BEF}$=base engine friction torque (includes the torque to overcome engine internal friction and the torque to rotate the engine manufacturer-installed accessories (i.e., water pump, oil pump, etc.)):

T$_{ACCES}$=accessory torque (torque to operate vehicle accessories, such as air-conditioning, fans, lights, etc.); and T$_{ACCEL}$=torque to accelerate engine, calculated from engine acceleration or deceleration and moment of inertia (I) of engine.

The control parameter GCW$_{CP}$ i ndicative of vehicular GCW is useful in determining feasibility of shifts in an automated transmission system, see U.S. Pat. Nos. 5,272, 939; 5,241,476 and 5,172,609 and copending Ser. No. 09/232/252, the disclosures of which are incorporated herein by reference, as well as in fleet management systems, antilock brake systems (ABS), central tire inflation systems (CTIS), active suspension systems and the like.

In particular, the transmission system control logic will use GCW to evaluate if, upon sensing a requirement for an upshift, a single, skip or double skip upshift should be attempted under current operating conditions. Briefly, based upon the value of the GCW control parameter and the sensed acceleration, the torque necessary to achieve at least zero acceleration in a possible gear ratio may be estimated. If a lower-than-actual GCW value is utilized, the control logic will overestimate the required drivewheel torque to maintain existing speed, and upshifts will be undesirably prohibited. If a higher-than-actual GCW value is utilized, the vehicle control logic will underestimate the drivewheel torque required to maintain speed, and the logic will become undesirably overagressive and attempt undesirable skip upshifts.

While the above-described preferred method/system for determining the value of a control parameter indicative of vehicular GCW is highly effective, due to its averaging/filtering techniques (which are deemed necessary in view of heavy-duty vehicle drivetrain torsionals, noise and the like), the method/system, in certain circumstances, may not be as responsive to relatively large changes in vehicle loading as is desirable. Examples of relatively large changes in vehicle loading include loading or unloading (dumping) cargo, adding or dropping a trailer or semi-trailer, embarking or disembarking a group of coach passengers and the like.

To resolve this problem, when conditions indicative of a potential large change in vehicle GCW are sensed, such as when the vehicle has been turned off and then restarted, the control logic will set the GCW control parameter value GCW$_{CP}$ to a default value.

According to the control system/method of the present invention, when resetting the value of the GCW control parameter GCW$_{CP}$, the default value is selected to be a very high value, such as, for example, 180,000 to 300,000 pounds, and certain skip upshifts, but not single upshifts, are prohibited until the value of the $GCW_{CP}$ control parameter is verified with confidence. It has been found that after about fifty filterings of the $GCW_{CP}$ value, the initial default value will become insignificant in the filtered value.

By way of example, until the $GCW_{CP}$ value is verified by fifty filterings after reset to default, skip upshifts of greater than a 50% step are prohibited. Thereafter, skip upshifts of greater than 80–100% are prohibited. Single upshifts are not prohibited if otherwise allowable, according to the shift logic.

By using the above control logic, after a resetting of the GCW parameter, such as at power-up of the system, aggressive upshifting, but not overly aggressive skip upshifting, is available.

Figure 2A:
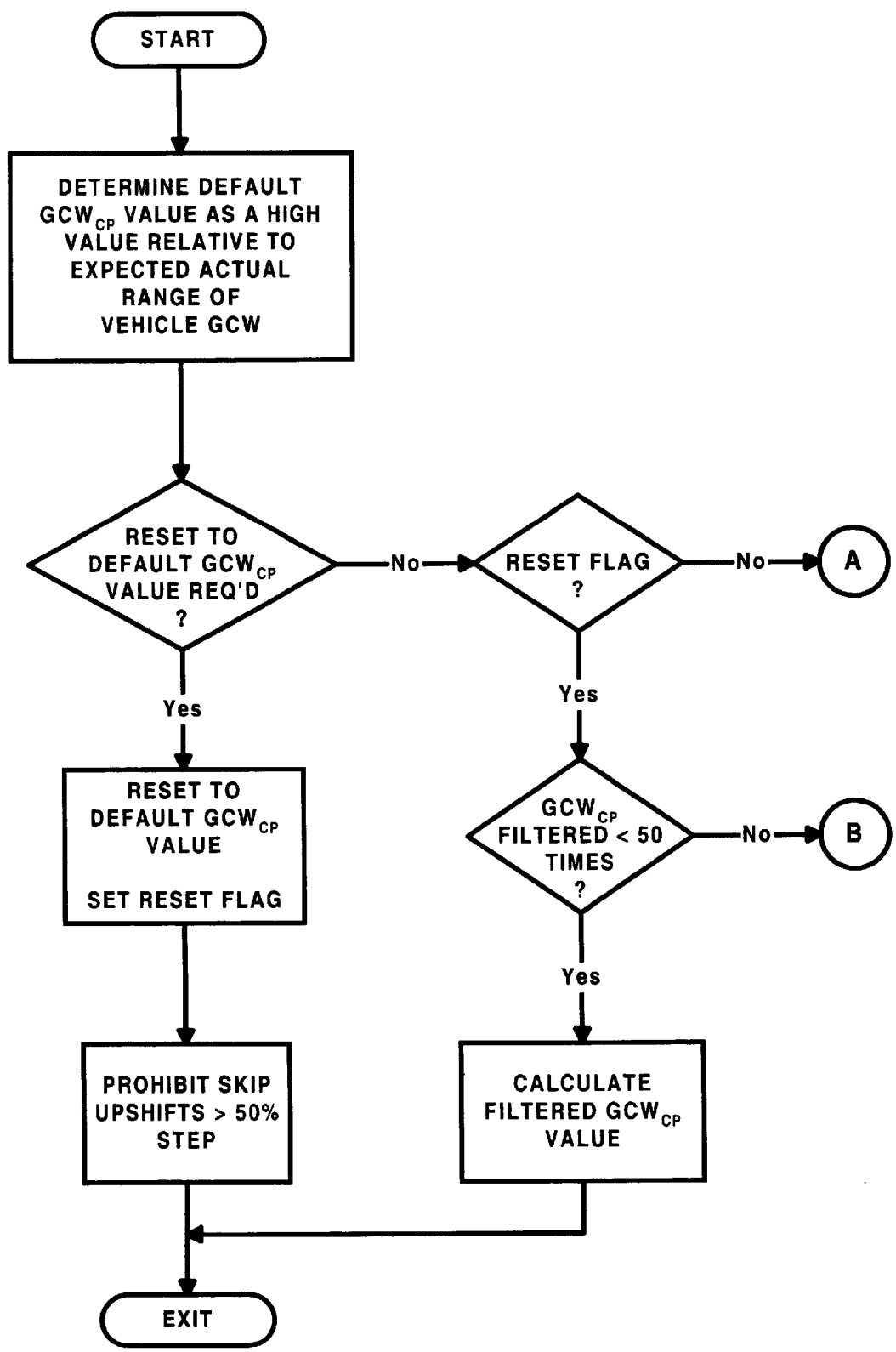
FIGS. 2A and 2B are schematic illustrations, in flow chart format, of the GCW determination method of the present invention.
Figure 2B:
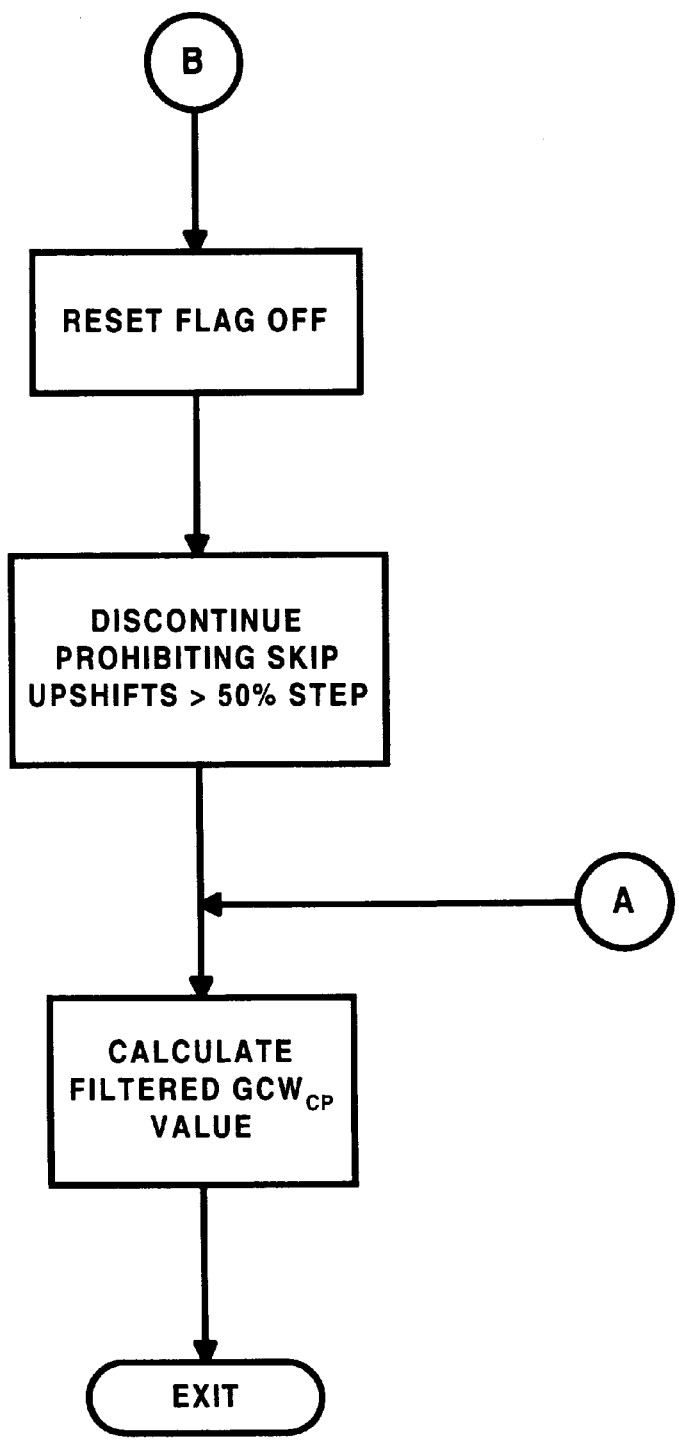

This embodiment of the present invention is illustrated in flow chart format in FIGS. 2A and 2B.

Although the present invention has been described with a certain degree of particularity, it is understood that various changes to form and detail may be made without departing from the spirit and the scope of the invention as hereinafter claimed.

We claim:

1. A control system for an automated transmission system on a vehicle having a predetermined range of expected combined gross weight, said transmission system including a controller for controlling said vehicle system as a function of input signals and predetermined logic rules, said control system comprising:

means for continuously determining current vehicular gross combined weight upon the occurrence of determination enabling conditions;

means for determining a revised control parameter value ($GCW_{CP}$) indicative of current gross combined weight as a filtered average of a current and a predetermined first plurality of previous determinations of current vehicular gross combined weight;

means for setting said control parameter value to a predetermined default value and prohibiting predetermined upshifts upon the occurrence of resetting conditions, said default value greater than the average of said predetermined range; and means for ceasing to prohibit said predetermined upshifts after a predetermined number of occurrences of said determination enabling conditions after said control parameter is set to said default value.

2. The system of claim 1 wherein said default value is equal to or greater than the upper value of said predetermined range.

3. The system of claim 1 wherein said number of occurrences is equal to or greater than about 50.

4. The system of claim 2 wherein said number of occurrences is equal to or greater than about 50.

5. The control system of claim 1 wherein said enabling conditions comprise completion of an upshift within a predetermined period of time.

6. The system of claim 1 wherein said prohibited skip upshifts are upshifts of greater than a predetermined percentage step.

7. The system of claim 6 wherein said predetermined percentage step is about a 50% ratio step.

8. The system of claim 2 wherein said prohibited skip upshifts are upshifts of greater than a predetermined percentage step.

9. The system of claim 8 wherein said predetermined percentage step is about a 50% ratio step.

10. The system of claim 3 wherein said prohibited skip upshifts are upshifts of greater than a predetermined percentage step.

11. The system of claim 10 wherein said predetermined percentage step is about a 50% ratio step.

12. A method for controlling an automated mechanical transmission system on a vehicle having a predetermined range of combined gross vehicle weight, said vehicle system including a controller for controlling said vehicle system as a function of input signals and predetermined logic rules, said method comprising the steps of:

continuously determining current vehicular gross combined weight upon the occurrence of determination enabling conditions;

setting said control parameter value to a predetermined default value and prohibiting predetermined upshifts upon the occurrence of resetting conditions, said default value greater than the average of said predetermined range; and means for ceasing to prohibit said predetermined upshifts after a predetermined number of occurrences of said determination, enabling conditions after said control parameter is set to said default value.

13. The method of claim 12 wherein said default value is equal to or greater than the upper value of said predetermined range.

14. The method of claim 12 wherein said number of occurrences is equal to or greater than about 50.

15. The method of claim 13 wherein said number of occurrences is equal to or greater than about 50.

* * * * *